(12) United States Patent
Marcy

(10) Patent No.: US 9,266,572 B2
(45) Date of Patent: Feb. 23, 2016

(54) FIFTH-WHEEL HITCH SYSTEM

(71) Applicant: Dewey R. Marcy, Greeley, CO (US)

(72) Inventor: Dewey R. Marcy, Greeley, CO (US)

(73) Assignee: Quick Hitch, Inc., Greeley, CO (US)

( * ) Notice: Subject to any disclaimer, the term of this patent is extended or adjusted under 35 U.S.C. 154(b) by 45 days.

(21) Appl. No.: 13/999,677

(22) Filed: Mar. 17, 2014

(65) Prior Publication Data

US 2015/0259015 A1 Sep. 17, 2015

(51) Int. Cl.
*B60D 1/07* (2006.01)
*B62D 53/08* (2006.01)
*B60D 1/06* (2006.01)
*B60R 9/06* (2006.01)

(52) U.S. Cl.
CPC ............... *B62D 53/08* (2013.01); *B60D 1/065* (2013.01); *B60D 1/075* (2013.01); *B62D 53/0871* (2013.01); *B60R 9/06* (2013.01)

(58) Field of Classification Search
CPC ............... B62D 53/08; B62D 53/0807; B62D 53/0835; B62D 53/0871; B62D 53/068
See application file for complete search history.

(56) References Cited

U.S. PATENT DOCUMENTS

| | | | | |
|---|---|---|---|---|
| 1,330,805 A | * | 2/1920 | Hesse | 280/441 |
| 1,351,245 A | * | 8/1920 | Hartwick | 280/434 |
| 1,380,490 A | * | 6/1921 | Masury | 280/439 |
| 1,969,288 A | * | 8/1934 | Young et al. | 280/438.1 |
| 2,306,459 A | * | 12/1942 | Mennen | 280/439 |
| 2,353,267 A | * | 7/1944 | Reid | 280/440 |
| 2,454,626 A | * | 11/1948 | Borzell | 280/432 |
| 2,541,209 A | * | 2/1951 | Cox | 280/402 |
| 2,670,220 A | * | 2/1954 | Colpo | 280/441.1 |
| 2,726,879 A | * | 12/1955 | Vaillant | 280/441.1 |
| 3,122,382 A | * | 2/1964 | Carrier | 280/438.1 |
| 3,685,853 A | * | 8/1972 | Goldsmith | 280/81.1 |
| 4,017,095 A | * | 4/1977 | Best | 280/438.1 |
| 4,093,265 A | * | 6/1978 | Hodge | 280/438.1 |
| 4,199,168 A | * | 4/1980 | Bush et al. | 280/439 |
| 4,444,408 A | * | 4/1984 | Goth | 280/438.1 |
| 4,585,248 A | * | 4/1986 | Miller et al. | 280/432 |
| 5,344,172 A | * | 9/1994 | Jaun | 280/415.1 |
| 5,356,167 A | * | 10/1994 | Hall et al. | 280/492 |
| 5,513,869 A | * | 5/1996 | Putnam | 280/415.1 |
| 5,639,106 A | * | 6/1997 | Vitale et al. | 280/407 |
| 5,839,745 A | * | 11/1998 | Cattau et al. | 280/434 |
| 6,135,482 A | * | 10/2000 | Larkin | 280/416.1 |
| 6,170,850 B1 | * | 1/2001 | Works | 280/433 |

(Continued)

FOREIGN PATENT DOCUMENTS

| | | | | |
|---|---|---|---|---|
| CH | 572836 | * | 2/1976 | B62D 53/08 |
| DE | 1182077 B | * | 11/1964 | B62D 53/08 |

(Continued)

*Primary Examiner* — Joseph Rocca
*Assistant Examiner* — Maurice Williams
(74) *Attorney, Agent, or Firm* — Dean P. Edmundson

(57) ABSTRACT

A fifth-wheel hitch system is described including: (a) a framework having an upright support; wherein the framework is adapted to be secured to a towing vehicle; (b) a support plate member secured to the top of the support member; wherein the plate member preferably includes a raised central portion and lower side portions; (c) a yoke member attached to the support plate member with fasteners which allow the yoke to be tilted away from the raised central portion of the plate member and then biased back to a central position; and (d) a receiver member attached to the yoke member for receiving and releasably connecting to the king pin of a trailer to be towed.

5 Claims, 3 Drawing Sheets

(56) References Cited

U.S. PATENT DOCUMENTS

| | | | |
|---|---|---|---|
| 6,908,093 B1 * | 6/2005 | Putnam | 280/435 |
| 7,753,391 B1 * | 7/2010 | Hesse et al. | 280/439 |
| 8,430,418 B2 * | 4/2013 | McCoy et al. | 280/438.1 |
| 8,827,298 B2 * | 9/2014 | Diller | 280/433 |
| 9,145,178 B2 * | 9/2015 | Erickson | B62D 53/061 |
| 2004/0169348 A1 * | 9/2004 | Winckler | 280/425.2 |
| 2007/0052204 A1 * | 3/2007 | Kaplenski | 280/455.1 |
| 2009/0127822 A1 * | 5/2009 | Colibert et al. | 280/438.1 |
| 2012/0018979 A1 * | 1/2012 | McCoy et al. | 280/441.1 |

FOREIGN PATENT DOCUMENTS

| | | | | |
|---|---|---|---|---|
| DE | 102006057327 A1 * | 6/2008 | | B62D 53/08 |
| FR | 1119992 A * | 6/1956 | | B62D 53/08 |
| WO | WO 9730866 A1 * | 8/1997 | | B60P 1/16 |

\* cited by examiner

FIFTH-WHEEL HITCH SYSTEM

CROSS-REFERENCE TO RELATED APPLICATION

This application is based upon, and claims priority from, my Provisional Application No. 61/853,269, filed Apr. 1, 2013.

FIELD OF THE INVENTION

This invention relates to hitch systems used for pulling or towing fifth-wheel type trailers with a towing vehicle (e.g. a truck). More particularly, this invention relates to improvements in the construction and utilization of fifth-wheel hitch systems.

BACKGROUND OF THE PRIOR ART

Conventional fifth-wheel hitch systems involve use of a king pin secured to the underside portion of the forward end of a trailer to be towed, e.g. a camper trailer. The truck used for towing the trailer has a receiver portion mounted to it which is adapted to receive and releasably connect to the king pin. Normally the receiver portion is secured to a framework in the bed of the truck with a plurality of bolts which extend downwardly through the bed and are fastened to the truck frame. The receiver portion (a receiver plate) may be attached to the hitch framework by means of a yoke member which allows the receiver plate to tilt or rotate about a horizontal plane which is perpendicular to the longitudinal axis of the truck. This feature allows the receiver plate to tilt forwardly or rearwardly, for example, relative to the hitch framework when the towing truck goes over inclines or sloping terrain where the rear wheels of the truck become raised (or lowered) relative to the front of the truck.

However, in certain towing situations the trailer is subjected to various twisting forces, e.g. when the towing vehicle is tipped to one side or the other relative to the trailer, such as when the towing vehicle turns onto or off from a roadway which is lower or higher than its current path. In those situations one side of the towing vehicle becomes higher that the other side while the trailer is still in the original plane. This twisting action also can occur when only one side of the towing vehicle travels over a bump (or through a hole). These twisting forces are very undesirable. They place further burdens on the hitch system itself, and the trailer frame can be twisted or otherwise damaged.

A prior art method for alleviating the problem of twisting forces in the fifth-wheel hitch involves the use of a universal joint in which there are two axis of rotation at 90° to each other. This necessarily requires maintenance of two joints and also adds to the overall weight and cost of the hitch system.

There has not heretofore been provided a fifth-wheel hitch system having the advantages and features of the present invention.

BRIEF SUMMARY OF THE INVENTION

The present invention provides an improved fifth-wheel hitch system comprising:

(a) a framework system comprising an upright support member; wherein the framework system is adapted to be secured to a towing vehicle;

(b) a support plate secured to the top of the support member; wherein the support plate member preferably includes a raised central portion and lower side portions;

(c) a yoke member attached to the plate member by means of fasteners which allow the yoke member to be tilted away from the central portion of the plate member and then biased back to a central position; and (d) a receiver portion attached to the yoke member for receiving and releasably connecting to the king pin of a trailer to be towed.

The improved fifth-wheel hitch system enables the receiver portion of the hitch to tilt either to the left or to the right of the longitudinal centerline of the towing vehicle, as needed in order to accommodate left and right tilting of the trailer being towed as the trailer travels over uneven ground. This avoids twisting of the trailer frame. In one embodiment the fifth-wheel hitch system can be easily secured to a conventional ball-type hitch in the bed of a truck. The hitch system of the invention can be easily disconnected from the ball-type hitch when the fifth-wheel hitch is no longer needed.

DETAILED DESCRIPTION OF THE INVENTION

Figure 1:
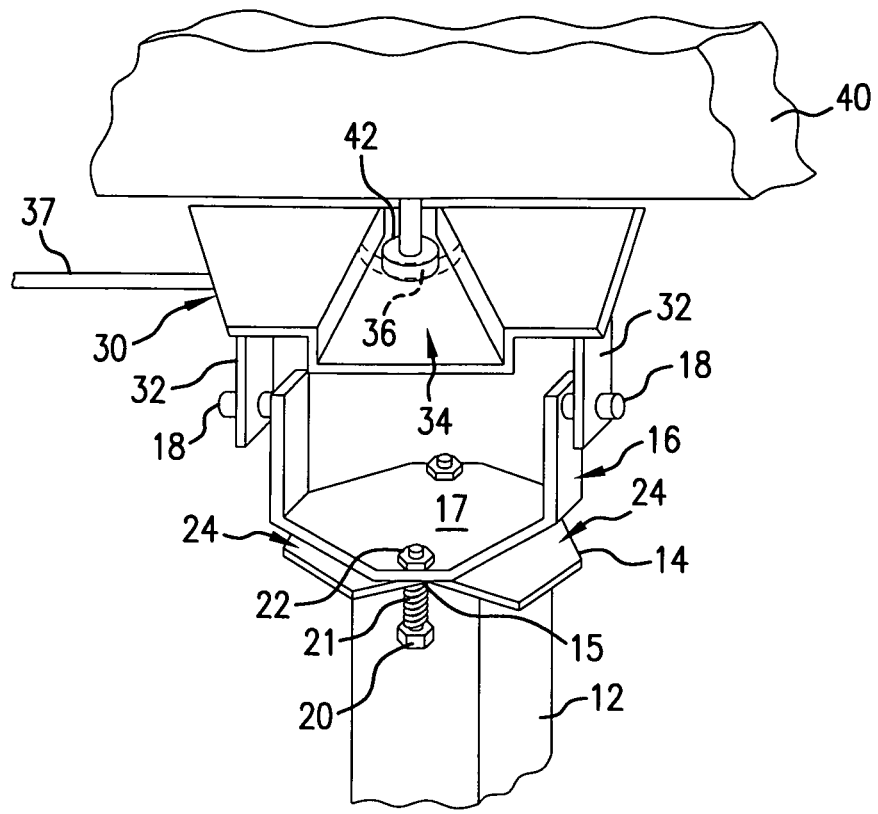
FIG. 1 illustrates one embodiment of a fifth-wheel type hitch system of the present invention that is suitable for use in towing fifth-wheel type trailers with a vehicle such as a truck.

One embodiment of the hitch system 10 of the present invention is illustrated in FIG. 1. The hitch system includes an upright support member 12 having a plate member 14 secured to its upper end. Attached to the plate member is a yoke 16 having a relative flat base 17 and outwardly protruding shafts or fingers 18 (one extending outwardly from each side of the yoke, as shown). The yoke is attached (by means of fingers 18) to the legs 32 of a receiver 30. The receiver includes a pathway 34 for guiding the king pin 42 of trailer 40 to a lockable (i.e. latch) position in the receiver where latch 36 captures the king pin. Lever 37 enables the user to unlatch the king pin when desiring to unhook the trailer from the towing vehicle. Because the receiver is attached to the yoke solely by means of the fingers on the sides, the yoke allows for pivoting action of the receiver in the longitudinal direction but not in a side-to-side or lateral direction The yoke is attached at the center of its base to the central portion of the support plate 14 by means of bolts 20 which extend through corresponding holes in the yoke base and the plate 14. A spring 21 encircles the bolt and provides a biasing action when yoke 16 is tilted to one side or the other away from the center of the support plate. The tension on the spring can be increased (or decreased) by means of tightening or loosening nut 22 on the upper end of bolt 20.

As shown in FIG. 1, the support plate may have a central portion 15 which is raised relative to the rest of the support plate. This may be by means of a crease in the plate or by means of an arc in the plate. In either event, a gap 24 is created between each side portion of the plate and the base of the yoke. The gap is preferably at least about 0.5 inch but could larger (e.g. about 1 inch). The gap on each side of the plate enables the yoke 16 to be tilted either to the right or to the left (e.g. when the trailer or the towing truck go over bumps or holes in the roadway, or when the truck turns off from one road onto another and the roadways are at different elevations). This avoids harmful twisting of the trailer while towing.

Figure 2:
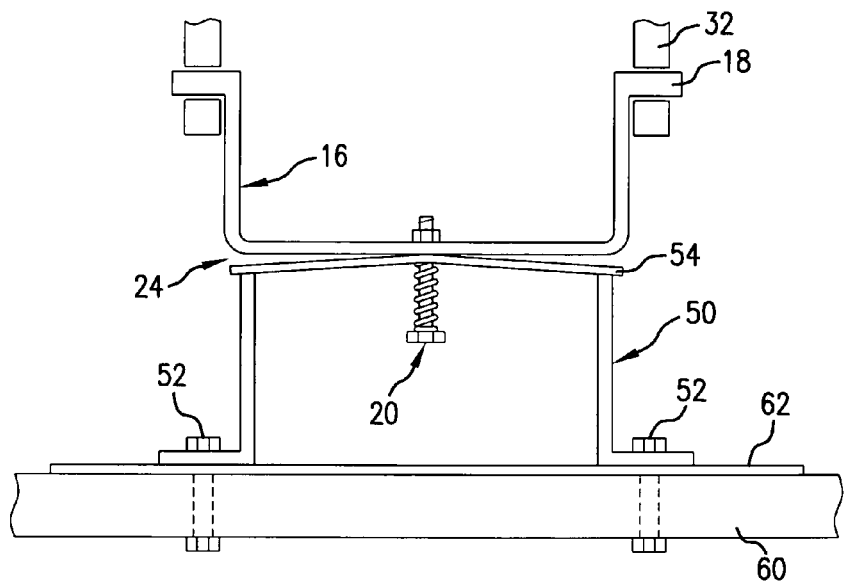
FIG. 2 is an elevational view of another configuration of a fifth-wheel hitch system of the invention.

FIG. 2 is an elevational view (partially cut-away) of another embodiment of hitch system of the invention where the upright support member 50 is bolted to the frame 60 below bed 62 of a towing vehicle by means of bolts 52. The support member 50 includes a plate 54 to which the yoke member 16 is attached by means of bolts 20. A gap 24 is shown between the side portions of the support plate 54 and the yoke member 16.

Figure 3:
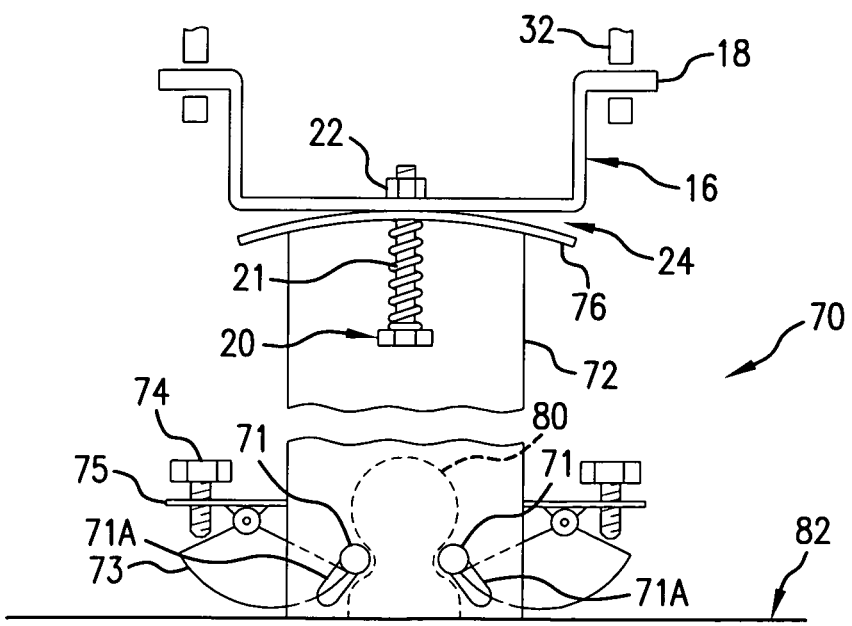
FIG. 3 is an elevational view of yet another configuration of a hitch system of the present invention that is suitable for use with a ball type of hitch located in the bed of a truck.

FIG. 3 is an elevational view (partially cut-away) showing another embodiment 70 of hitch system of the invention. In this embodiment the lower end of the upright support member 72 is releasably connected to a conventional ball 80 secured in the bed 82 of a towing vehicle. The connection is made by means of locking pins 71 which are adapted to move in separate guideways 71A between retracted and extended positions to lock the support member to the ball 80. The locking pins are located on opposite sides of the ball, as shown. Rotatable cam members (which are pivotably mounted to ears 75) are caused to push the locking pins upwardly against the ball by means of threaded screws 74. A support plate 76 is secured to the upper end of the support member 72, and yoke 16 is attached to the support plate by means of bolts 20 (as described in connection with FIG. 1). A gap 24 is shown between the side portions of the plate 76 and the yoke 16. The receiver 32 for the hitch system is attached to the ears 18 of the yoke, as described in connection with FIG. 1.

The embodiment shown in FIG. 3 is especially useful when it is desired to use the existing ball-type hitch in a towing vehicle in order to tow a trailer which has a fifth-wheel type hitch. Thus, it is not necessary to purchase a relatively heavy and expensive framework for a conventional fifth-wheel hitch arrangement. Also, with the embodiment shown in FIG. 3, the upright support member can be easily and quickly detached from the ball hitch so that the towing vehicle can use the ball hitch for towing gooseneck trailers.

Figure 4A:
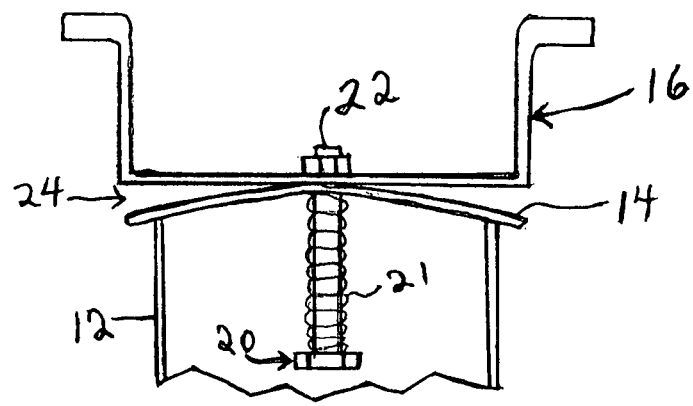
FIGS. 4A and 4B are elevational views of two different types of support plates that are useful in the hitch systems of the invention.
Figure 4B:
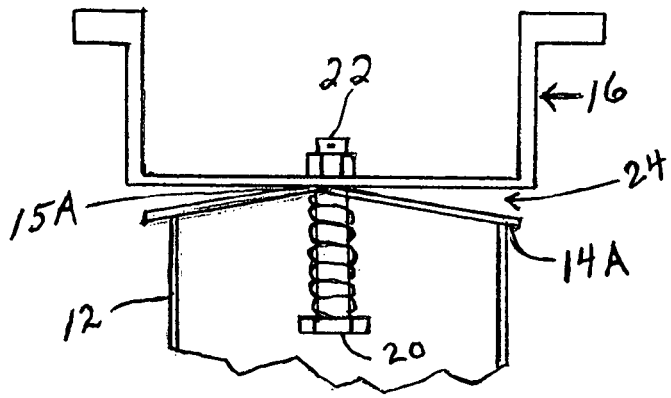

FIGS. 4A and 4B are elevational views illustrating two different manners in which the side portions of the support plate are lower than the central portion of the plate. In FIG. 4A the support plate 14 is curved so that the outer portions of the plate form a gap 24 on each side, as shown. Preferably the gap is in the range of about 0.5 to 1 inch. In FIG. 4B the support plate 14A includes a central ridge 15A (with the ridge extending along the center of the plate in a longitudinal direction of the towing vehicle). Gap 24 is therefore provided between the outer portions of the support plate and the yoke 16. The extent of the crease forming the ridge may vary, but typically a crease of about 5 degrees is sufficient to provide the desired gap on each side. As previously stated, the presence of the gaps on the sides of the plate enable the yoke (and, thus, the trailer) to rock or tilt to one side or the other when the trailer and towing vehicle go over bumps or uneven ground.

Figure 5A:
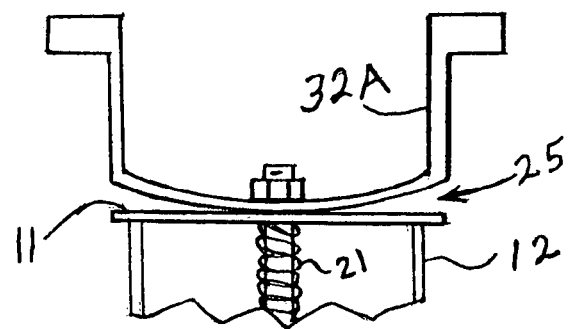
FIGS. 5A and 5B are elevational views of two different embodiments of yoke members which are useful in the present invention.
Figure 5B:
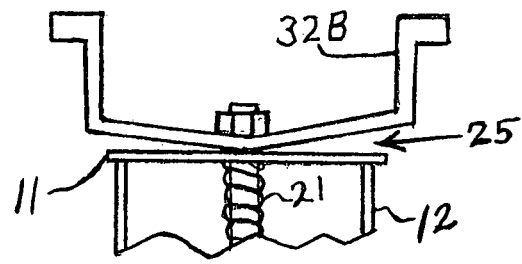

FIGS. 5A and 5B illustrate other embodiments of the hitch system wherein the support plate 11 is planar, and the yoke member has been modified so that a gap 25 is defined at each side edge between the yoke and the support plate. In FIG. 5A the yoke 32A is provided with a slightly rounded or curved bottom surface, as shown. In FIG. 5B the yoke 32B has been provided with a creased bottom, as shown, with the crease running in the longitudinal direction.

Figure 6:
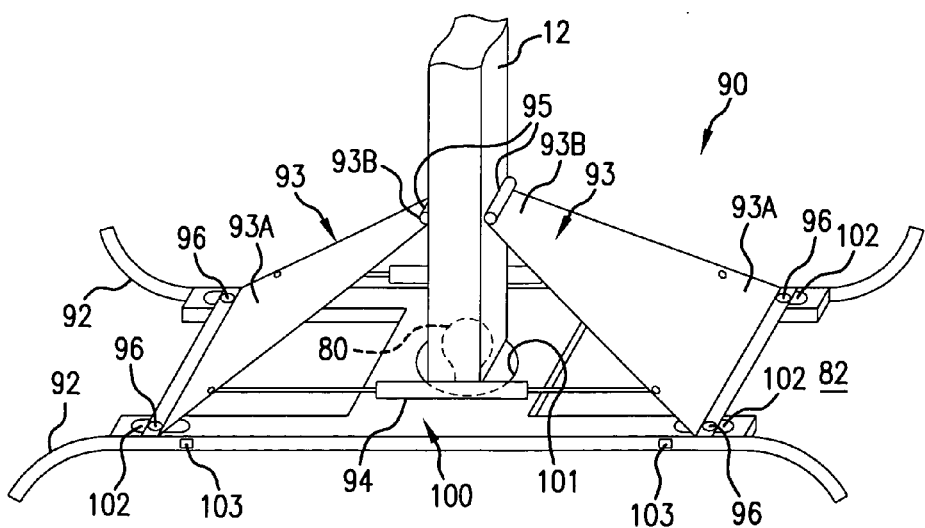
FIG. 6 illustrates one embodiment of bracing which may be used in conjunction with one type of hitch system of the invention.

FIG. 6 illustrates one type of bracing which may be used in conjunction with the hitch system which is connected to a conventional ball-type hitch in a towing vehicle. The bracing includes elongated base member 100 having a central opening 101 to accommodate the ball 80 secured in truck bed 82. The base member 100 lies on the bed of the truck and may include elongated leg extension members 92 positioned on opposite sides of the base member and bolted thereto by means of bolts 103, for example. Brace members 93 are positioned forwardly and rearwardly of the upright support member 12. The lower end 93A of each brace is secured to the base member 100 with bolts 96 which extend through the lower end of the brace and through elongated slots 102 in the base. The upper ends 93B of the braces are positioned, respectively, against the forward and rearward sides of the upright support member 12 beneath stop members 95 (which may be, for example, metal bars welded or otherwise secured to the support post 12 on the forward and rearward surfaces, as shown). Turnbuckles 94 are attached at opposite ends thereof to the two braces 93. When the turnbuckles are tightened, the upper ends 93B of braces 93 are drawn upwardly against stop members 95, and the lower ends 93A are pulled toward the support post 12 (sliding the bolts 96 in the slots 102) to complete triangular bracing of the support post. In this manner, the support post is very rigidly held in a straight upright position during use. It is very easy to remove the bracing when it is necessary to remove the hitch system from the truck bed.

Other variants are possible without departing from the scope of this invention.

What is claimed is:

1. In a fifth-wheel hitch system comprising an upright support member, a yoke member for attachment between said support member and a trailer to be towed, wherein the improvement comprises (a) a support plate secured to said support member and having an upper surface, and (b) attachment means attaching said yoke member to said upper surface of said support plate in a manner which enables said yoke member to rock from side-to-side relative to said support plate; wherein said attachment means comprises bolts extending through said yoke member and said support plate, and further comprising spring members on said bolts for biasing said yoke to a central position relative to said support plate.

2. The improvement in accordance with claim 1, wherein said support plate includes a raised central portion and lower side portions which each define a gap between said support plate and said yoke member; wherein each said gap is in the range of about 0.5 to 1.0 inch.

3. The improvement in accordance with claim 1, wherein said upright support member is adapted to connect to a ball hitch on a towing vehicle.

4. The improvement in accordance with claim 1, wherein said yoke member includes a lower ridge which rests on said support plate; wherein a gap is defined between said yoke member and opposite side edges of said support plate.

5. A fifth-wheel hitch system for connecting a trailer to a towing vehicle having a ball hitch extending upwardly from a bed, the system comprising:
(a) an upright support member having upper and lower ends; wherein said upper end includes a support plate and said lower end is adapted to be connected to said ball on said towing vehicle; wherein said support plate has side portions and a raised central portion;

(b) a yoke member for connecting to the trailer to be towed;
(c) attachment means for attaching said yoke member to said support plate; wherein a gap is defined between each side portion of said support plate and said yoke member; wherein said attachment means comprises bolts which extend through said yoke member and said support plate; wherein said attachment means further comprises springs on said bolts for biasing said yoke member to a central position; wherein said attachment means enables said yoke member to tilt from side-to-side relative to said support plate;
(d) bracing means between said upright support member and said bed of said towing vehicle providing longitudinal bracing forwardly and rearwardly of said support member.

* * * * *